(No Model.)  
J. N. MILLER.  
VEHICLE BODY.

No. 569,794.

3 Sheets—Sheet 1.

Patented Oct. 20, 1896.

Witnesses.  
Herbert Bradley  
Walter Allen

Inventor:  
Jacob N. Miller  
By Knight Bros  
Attorneys (No Model.)

J. N. MILLER.
VEHICLE BODY.

No. 569,794.

3 Sheets—Sheet 2.

Patented Oct. 20, 1896.

Witnesses:
Herbert Bradley.
Walter Allen

Inventor:
Jacob N. Miller.
By Knight Bros
Attorneys.

(No Model.) 3 Sheets—Sheet 3.

J. N. MILLER.
VEHICLE BODY.

No. 569,794. Patented Oct. 20, 1896.

Witnesses:
Herbert Bradley
Walter Allen

Inventor
Jacob N. Miller
By Knight Bros
Attorneys

UNITED STATES PATENT OFFICE.

JACOB N. MILLER, OF BELLEFONTAINE, OHIO.

VEHICLE-BODY.

SPECIFICATION forming part of Letters Patent No. 569,794, dated October 20, 1896.

Application filed June 12, 1895. Serial No. 552,538. (No model.)

*To all whom it may concern:*

Be it known that I, JACOB N. MILLER, a citizen of the United States, and a resident of Bellefontaine, in the county of Logan and State of Ohio, have invented a new and useful Improvement in Vehicle-Bodies, of which the following is a specification.

My invention relates to certain improvements in interconvertible one and two seated conveyances and especially in those of the surrey-trap order.

Figure 1:
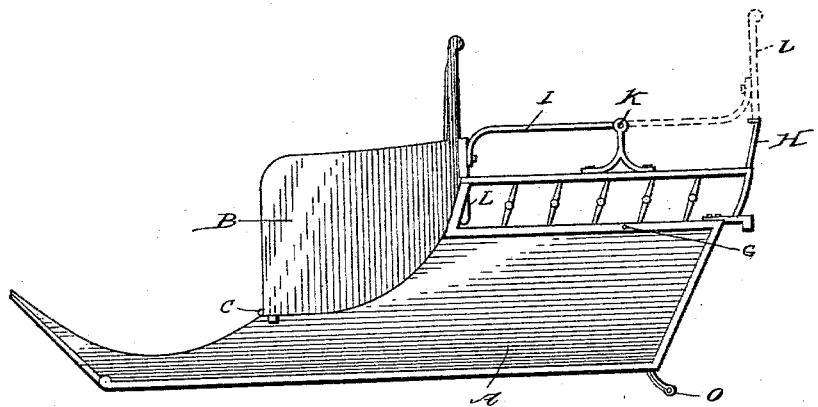
Figure 2:
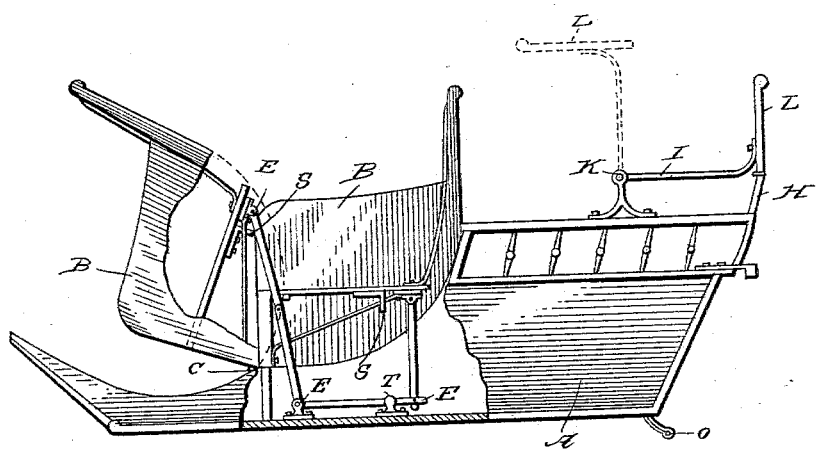
Figure 3:
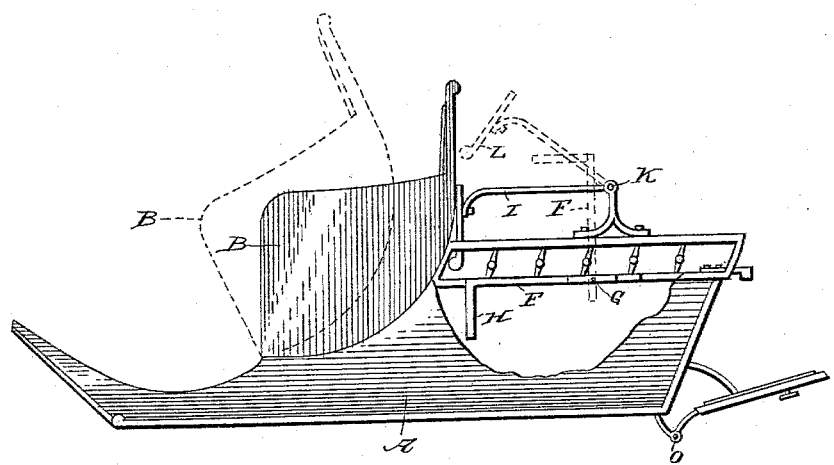
Figure 4:
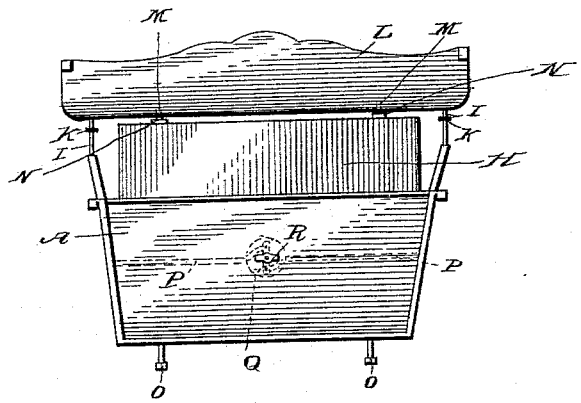
Figure 6:
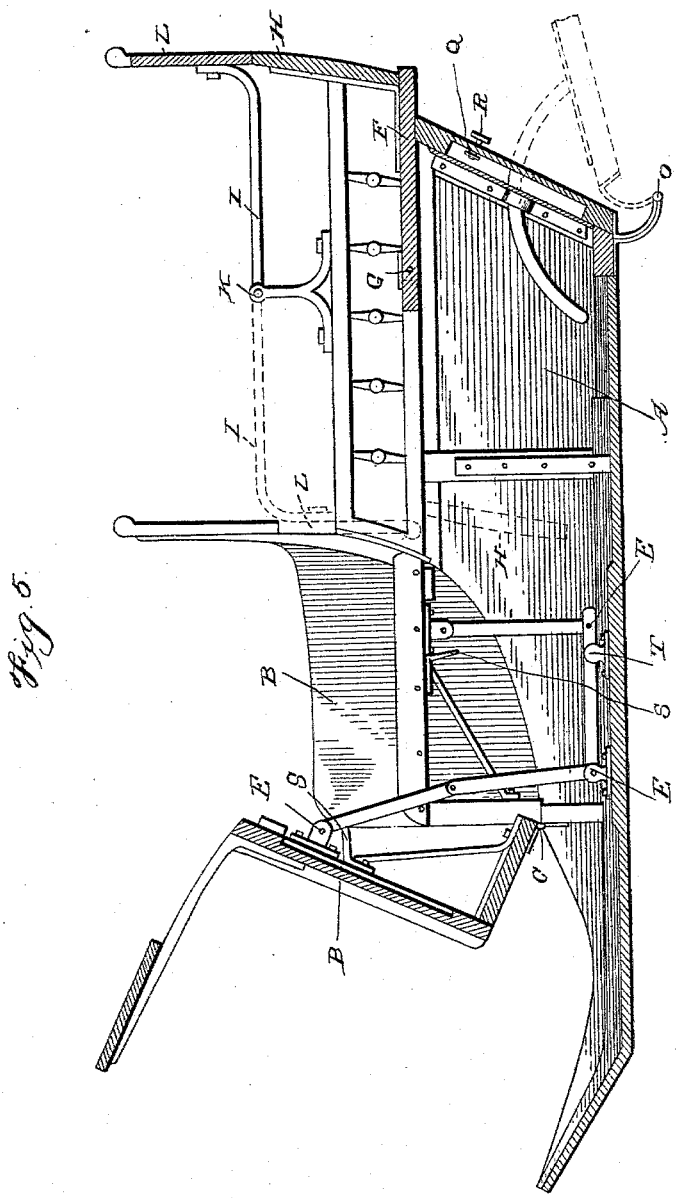

Figure 1 is a side view of my vehicle-body used as a two-seated vehicle, both seats facing front, the back extension of the rear seat being shown thrown forward and its rear position shown in dotted lines. Fig. 2 is a side view with one half of the front seat raised for ingress to the rear seat, the back extension of the rear seat being shown as partly thrown forward in dotted lines. Fig. 3 is a side view showing my device used dos-à-dos, *i. e.*, as a two-seated vehicle, the rear seat facing backward and the back of the body proper or end-gate swung down for a support for the feet, the dotted lines showing the movements of the rear seat and seat-back extension in changing from style shown in Fig. 1. Fig. 4 is a rear view of my vehicle-body with the end-gate closed. Fig. 5 is a longitudinal section through the front seat, so as to show the arrangement of the guiding elbow-hinge.

The construction of my vehicle-body is as follows:

In the drawings, A is the rigid part of the body proper, B a hinged extension of the side which is supported on the side and in which is mounted the front seat, hinged at C C to a cross-piece in the bottom of the vehicle-body. The front seat is divided into two parts B B, each hinged at its front at C and hinged at the rear to the guiding elbow-hinge E. The rear seat F is pivoted at G, and rests, when used as a two-seated front-facing vehicle, on the end-gate or rear of the vehicle-body and has an extension H, forming part of the seat-back. Arm-rests I I are pivoted on the standards K and carry at the outer end an upward extension L of the back, lugs M on the lower half H of the back fitting in holes N in the upper part L of the back to keep it rigidly in place. The rear end of the vehicle-body is hinged on the curved hinges O and is held in place by the rods P P (shown in dotted lines, Fig. 4) and operated by the tumblers Q Q, mounted on the handle R.

The changes from one style of vehicle-body to another are accomplished as follows: With the vehicle-body in the form shown in Fig. 1 to start with, I form a dos-à-dos or opposite facing of the seats by raising the front seat on its hinges until the rear hinge E rests against the stop S on the bottom of the seat shown in Fig. 2. The arm-rests I and top of the rear seat are swung forward about a quarter-revolution on their pivots. The seat F and back extension H are then revolved half a revolution, turning the seat upside down, when the arm-rests are revolved another quarter of a revolution, bringing them parallel with the seats again. The seat and arm-rests are both pivoted in such manner as to revolve eccentrically to each other and bring the back into proper position, whichever way the seat is to face. By means of handle R the spring lock or bolts are thrown, allowing the end-gate to drop down into position for a foot-rest. By the use of curved hinges shown the gate is thrown away from the rear of the vehicle-body several inches when open, making a more convenient foot-rest. The front seat is then thrown back into position and a dos-à-dos vehicle formed, the parties on the front seat facing the horse and those on the back seat facing the rear.

That part of hinge E that is adjacent to the floor of the vehicle when the front seat is in use rests between two lugs T T, extending up from the floor or frame which keeps that part of the hinges rigid.

What I claim is—

1. A vehicle-body comprising a front seat hinged at its lower front edge to the body, and an elbow-hinge having one arm connected with the rear part of the front seat, and the other arm connected with the body beneath the front part of the seat; substantially as described.

2. A vehicle-body comprising a front seat hinged at its lower front edge to the body, an elbow-hinge connected with the rear part of the front seat, and the lugs secured to the body beneath the seat and providing rests for the elbow-hinge; substantially as described.

3. A vehicle-body comprising a front seat having a stop secured thereto, and hinged at its lower front edge to the body and the elbow-hinge connected with the rear part of the front seat and with the body and adapted to bear against the stop; substantially as described.

4. A vehicle-body comprising a rear seat having a half-back and pivoted to the body so as to be reversed, and the standards surmounting the body, and the arm-rests carrying a back extension and pivoted to the standards; substantially as described.

JACOB N. MILLER.

Witnesses:
M. H. McCORMICK,
EDWARD M. McLAUGHLIN.